(12) United States Patent
Craig et al.

(10) Patent No.: US 7,823,489 B1
(45) Date of Patent: Nov. 2, 2010

(54) SYSTEMS AND METHODS FOR MAKING A PIZZA PIE HAVING AN OUTER CHEESE PORTION

(75) Inventors: Todd W. Craig, Frisco, TX (US); Peter G. Graham, Lucas, TX (US); Jennifer T. Nguyen, Grand Prairie, TX (US)

(73) Assignee: Pizza Hut, Inc., Dallas, TX (US)

( * ) Notice: Subject to any disclaimer, the term of this patent is extended or adjusted under 35 U.S.C. 154(b) by 0 days.

(21) Appl. No.: 12/557,053

(22) Filed: Sep. 10, 2009

Related U.S. Application Data

(62) Division of application No. 11/111,467, filed on Apr. 21, 2005, now Pat. No. 7,610,837.

(51) Int. Cl.
*A21C 11/12* (2006.01)
*A21C 11/00* (2006.01)
*A21D 13/00* (2006.01)
*B26B 19/00* (2006.01)

(52) U.S. Cl. .................. 83/30; 83/565; 83/745; 83/821; 83/932; 30/292; 30/306; 30/319; 425/292; 425/293; 99/430; 99/432; 426/503; 426/517; 426/502

(58) Field of Classification Search .................. 30/50, 30/114, 124, 289, 292, 294, 286, 282, 432, 30/457, 319; 83/454, 455, 566, 30; D8/98; D7/354; 99/430, 432, 433; 425/293, 295, 425/289, 299; 219/621; 220/573.1
See application file for complete search history.

(56) References Cited

U.S. PATENT DOCUMENTS

| | | | | |
|---|---|---|---|---|
| 1,545,600 A | * | 7/1925 | Poole | 425/293 |
| 2,304,759 A | * | 12/1942 | Carroll | 30/307 |
| 2,598,626 A | * | 5/1952 | Wangeman | 425/293 |
| 2,791,029 A | * | 5/1957 | Henneberger | 30/305 |
| 3,716,319 A | * | 2/1973 | Norman | 425/293 |
| 4,661,361 A | * | 4/1987 | Mongiello et al. | 426/283 |
| 5,196,223 A | * | 3/1993 | Nakamura | 426/503 |
| 5,720,998 A | * | 2/1998 | Proctor et al. | 426/94 |
| 5,775,208 A | * | 7/1998 | Kimple | 99/422 |
| 6,286,708 B1 | * | 9/2001 | Scheibmeir et al. | 220/607 |

* cited by examiner

*Primary Examiner*—Laura M. Lee
(74) *Attorney, Agent, or Firm*—Stites & Harbison, PLLC; David W. Nagle, Jr.

(57) ABSTRACT

A system and/or method for making a pizza pie having an outer cheese portion comprises a cutting tool and/or a cutting guide to enable formation of at least one opening at an outer crust region of a pizza pie to cause an inner cheese portion embedded within the outer crust to flow through the at least one opening, thereby forming the outer cheese portion at the upper surface of the outer crust. A cutting tool of the system comprises a rotatable disc with notches in its cutting surface to enable formation of the at least one opening in the outer crust. A cutting guide of the system comprises a generally disc shaped member with a support surface at its outer edge for supporting and guiding application of a cutting device against an outer crust region of a pizza dough.

10 Claims, 8 Drawing Sheets

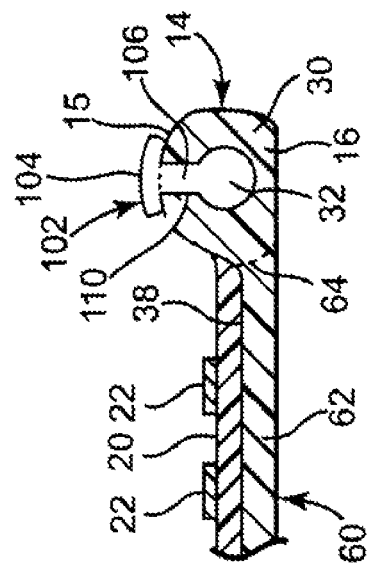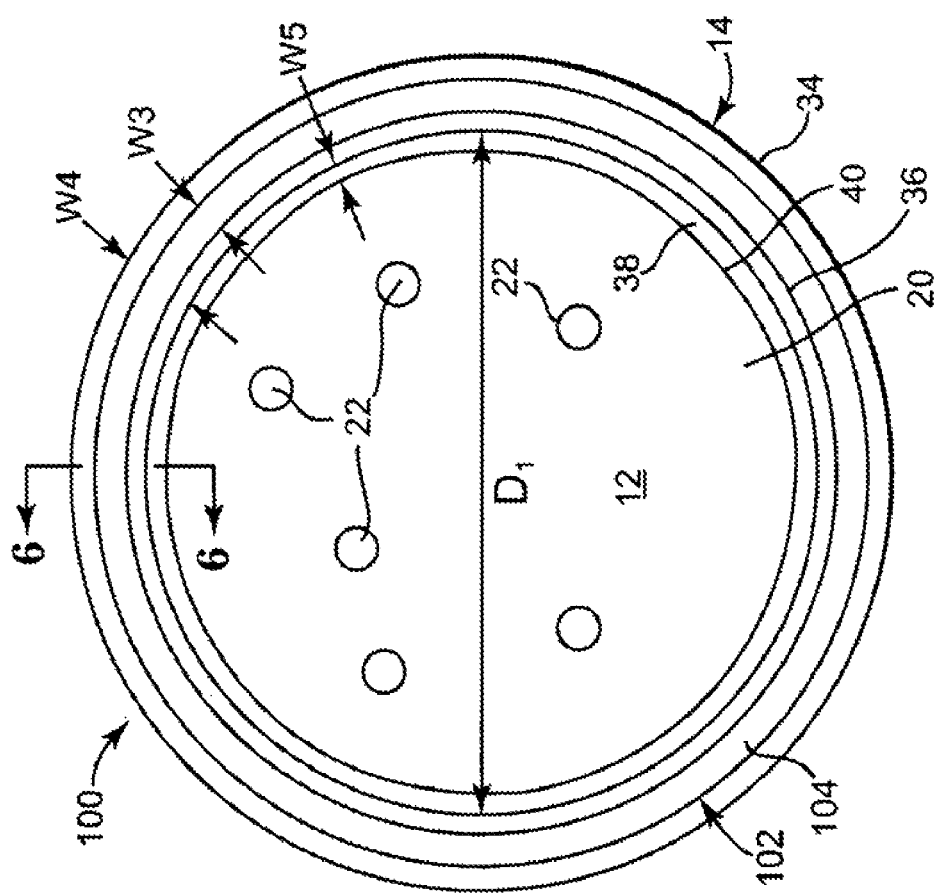

SYSTEMS AND METHODS FOR MAKING A PIZZA PIE HAVING AN OUTER CHEESE PORTION

CROSS-REFERENCE TO RELATED APPLICATIONS

This application is a divisional of U.S. patent application Ser. No. 11/111,467 filed on Apr. 21, 2005, now U.S. Pat. No. 7,610,837.

BACKGROUND OF THE INVENTION

Many national, regional, and local pizza companies compete with each other, hoping to distinguish themselves from competitors based on taste, value, quality, delivery, etc. One aspect of retail pizza business concerns presentation of the pizza pie and arrangement of the ingredients. For example, conventional pizza pies include a crust, a layer of sauce, and a layer of cheese and toppings, such as meat or vegetables. Consumers can choose between thin crust, thick crust, deep dish crust, and other crust variations.

In conventional pizza pies, a crust of a pizza pie includes a base portion and an outer crust. The base portion carries the cheese layer and toppings while the outer crust forms a boundary surrounding and containing the cheese layer and layer of toppings. The outer crust prevents the cheese and/or toppings from sliding or moving off of the base portion of the crust, both when the pizza pie is in its baking pan and on the table (or in a delivery box). The outer crust also provides a convenient way for a consumer to handle a piece of pizza while eating the pizza.

Because pizza pie retailers start with generally the same type of ingredients, retailers are challenged to present a pizza pie in a manner to distinguish their pizza pies from the pizza pies of their competitors.

SUMMARY OF THE INVENTION

Embodiments of the invention are directed to a system and methods for making pizza pie having an outer cheese portion. In one embodiment, a system comprises a cutting tool and/or a cutting guide to enable formation of at least one opening at an outer crust region of a pizza pie to cause an inner cheese portion embedded within the outer crust to flow through the at least one opening, thereby forming the outer cheese portion at the upper surface of the outer crust. In one embodiment, the outer cheese portion is separate from a main cheese portion on the base crust. In one embodiment, the cutting tool comprises a rotatable disc with notches in its cutting surface to enable formation of the at least one opening in the outer crust. In another embodiment, the cutting guide comprises a generally disc shaped member with a support surface at its outer edge for supporting and guiding application of a cutting device against an outer crust region of a pizza dough.

BRIEF DESCRIPTION OF THE DRAWINGS

Embodiments of the invention will be described with respect to the figures, in which like reference numerals denote like elements, and in which:

FIG. 5 is a plan view of a top portion of a pizza pie, according to an embodiment of the invention.

FIG. 6 is a partial sectional view of FIG. 5 as taken along lines 6-6, according to an embodiment of the invention.

DETAILED DESCRIPTION

Figure 1:
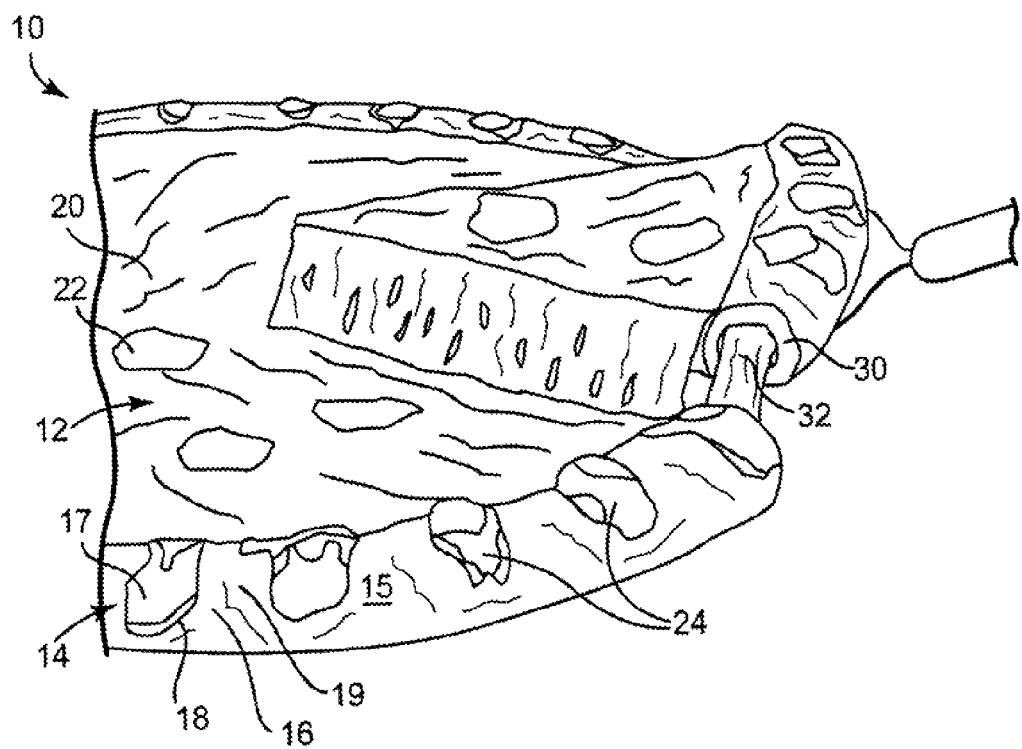
FIG. 1 is a perspective view of a pizza pie, according to an embodiment of the invention.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," "horizontal," "vertical," "rear," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention are directed to a pizza pie that includes an outer crust with an outer cheese portion at its upper surface. Embodiments of the invention are also directed to systems and methods of making the pizza pie including the separate outer cheese portion.

In one embodiment, the pizza pie comprises a base crust and an outer crust. The base crust carries a layer of ingredients, including a sauce layer, a main cheese layer, and/or a toppings layer, all of which are contained by the outer crust. The outer crust includes an outer cheese portion formed at an upper surface of the outer crust. In one aspect, the outer cheese portion is separate from (i.e., discontinuous relative to) the main cheese layer on the base crust.

In one embodiment, the outer cheese portion is deposited onto the upper surface of the outer crust prior to baking the pizza pie. The outer cheese portion can be deposited as strips, chunks, dots, etc. to achieve a particular configuration. After baking, the outer cheese portion melts to create a cheese pattern(s) on the outer crust that is separate from the main cheese portion (or layer) on the base crust of the pizza pie.

In another embodiment, the outer crust of the pizza pie contains an inner cheese portion embedded within the outer crust (i.e., a stuffed crust containing cheese). The outer cheese portion is formed (at the upper surface of the outer crust) by flow of the inner cheese portion (from its embedded position within the outer crust) to the upper surface of the outer crust via at least one opening, such as one or more holes (i.e., a flow hole) in the upper surface of the outer crust. The flow hole(s) can comprise a single slit, a plurality of slits, a single hole, and/or a plurality of holes, as well as combinations of the same. In one aspect, the outer cheese portion comprises a single member of cheese, while in other aspects, the outer cheese portion comprises a plurality of separate cheese members. The appearance of the outer cheese portion on the outer crust is enabled and controlled by selecting and manipulating the size, shape, and/or number of "flow" holes (or slits) in the upper surface of the outer crust, as well as the relative spacing between the flow holes.

In this embodiment, during baking of the pizza pie, portions of the inner cheese portion pass through the flow holes at the upper surface (from their embedded position within the outer crust) up to, or out onto, the upper surface of the outer crust. This arrangement produces an appearance of the inner cheese portion having exploded out onto or up to the upper surface of the outer crust. Accordingly, the pizza pie of this embodiment has a first pre-baking state in which no cheese appears at the upper surface of the outer crust and a second baking state (during baking or after baking) in which cheese appears at the upper surface of the outer crust. In one aspect of this embodiment, upon baking the pizza pie, the inner cheese portion flows to be exposed at the upper surface of the outer crust, thereby forming the outer cheese portion, but the outer cheese portion does not extend (vertically or horizontally) up out of or beyond the edges of the flow holes.

In one embodiment, the outer cheese portion (at the upper surface of the outer crust) extends about substantially the entire periphery of the outer crust and defines a shape generally corresponding to a general shape of the pizza pie. For example, when a pizza pie has a generally circular shape, the outer cheese portion has a generally circular shape. In another example, when a pizza pie has a generally rectangular shape the outer cheese portion has a generally rectangular shape. However, in other embodiments, the outer cheese portion extends only partially (e.g., one-quarter, one-third, one-half, etc. of a circle or rectangle) about the periphery of the outer crust.

In one embodiment, the outer cheese portion at the upper surface of the outer crust forms a substantially continuous member of cheese, such as a generally ring shaped member (for a generally circular shaped pizza pie) or a generally rectangular shaped member (for a generally rectangular shaped pizza pie).

In another embodiment, the outer cheese portion comprises a plurality of cheese members or units that are spaced apart from each other at the upper surface of the outer crust. In one aspect, the spacing between the adjacent cheese units is generally uniform, so that the cheese units are spaced apart generally equally from each other. In another aspect, the spacing of non-covered portions of the outer crust between the outer cheese units is variable so that the cheese units are spaced apart from each other by variable amounts. In addition, in one aspect, each cheese unit of the outer cheese portion is generally uniform in appearance, being substantially the same size and shape as other cheese units. In other aspects, at least some of the cheese units of the outer cheese portion have a size and/or shape substantially different from other cheese units.

Embodiments of the invention also comprise systems and methods of making a pizza pie that has an outer crust including an outer cheese portion. In one embodiment, the flow holes at the upper surface of the outer crust are formed generally about the same time that the inner cheese portion is being embedded (i.e., stuffed) within the outer crust. In particular, prior to enclosing the inner cheese portion with the pizza dough, slits are formed in the outer crust adjacent the location of the inner cheese. The outer edges of the pizza dough are then stretched up and over the inner cheese portion (in a direction toward the center of the pizza pie), and then pinched securely against the base portion of the pizza crust dough. During this stretching maneuver, the slits become reshaped as holes and the holes become positioned at the upper surface of the outer crust generally above the inner cheese portion. Later, during or after baking of the pizza pie, these flow holes enable flow of portions of the inner cheese portion from an embedded position up to an upper surface of the outer crust.

In one embodiment, a cutting tool includes a rotatable, notched disc that is used to form the slits in the pizza dough that become the flow holes. A cutting edge of the disc includes blade portions arranged in an alternating pattern with a notch interposed between pairs of adjacent blade portions. The blade portions are spaced apart by a distance that generally corresponds to the desired spacing of flow holes (at the upper surface of the outer crust), and therefore also generally corresponds to a size and/or shape of a plurality of cheese units of the outer cheese portion.

In one embodiment, flow holes in the outer crust are formed with other tools either before or after the inner cheese portion is embedded within the outer crust. In one aspect, when an inner cheese portion is already embedded within the outer crust, a tool is used to cut flow holes in the upper surface of the outer crust.

In one embodiment, prior to or during embedding of the inner cheese portion within the outer crust, a generally disc-shaped cutting guide is used to facilitate application of a cutting tool to form the slits in the pizza dough (adjacent the inner cheese portion) that will become the flow holes enabling formation of the outer cheese portion from the inner cheese portion.

In one embodiment, the inner cheese portion embedded within the outer crust comprises more than one type of cheese, and in some embodiments, comprises three different types of cheese (e.g., cheddar, mozzarella, swiss, etc.). In one aspect, the different types of cheese are combined into one inner cheese portion. In another aspect, one type of cheese is laid side-by-side or end-to-end with another of type(s) of cheeses to form the inner cheese portion.

These embodiments and other embodiments of the invention are described and illustrated in greater detail in association with FIGS. 1-17.

FIG. 1 is a perspective view of a pizza pie 10, according to an embodiment of the invention. Pizza pie 10 is shown in FIG. 1 in an assembled state to illustrate certain features of pizza pie 10 while other Figures illustrate additional features of pizza pie 10, as well as systems and methods for making pizza pies.

As shown in FIG. 1, in one embodiment, a pizza pie 10 comprises main portion 12 and outer portion 14. Main portion 12 comprises a layer of ingredients contained by outer portion 14. This layer of ingredients includes, but is not limited to, a sauce layer (not shown), a main cheese portion 20, and/or a toppings layer including toppings 22, all of which are contained by the outer portion 14. Outer portion 14 comprises an outer crust 16, which extends from main portion 12, and an outer cheese portion 17 at an upper surface 15 of the outer crust 16. In this embodiment, outer crust 16 includes a plurality of holes 18 with portions 19 of outer crust 16 extending between adjacent holes 18. In one embodiment, outer cheese portion 17 comprises a plurality of cheese units 24 which are arranged about a periphery of pizza pie 10 to form a generally circular pattern of cheese on outer crust 16. The cheese units 24 are separate from, and spaced apart from, each other on upper surface 15 of outer crust 16.

As shown in FIG. 1, and as described in more detail in association with FIGS. 2-17, in one embodiment, outer portion 14 of pizza pie 10 also comprises inner cheese portion 32 contained within a wall 30 of outer crust 16 (i.e., outer crust wall 30). In one aspect, outer crust wall 30 has a generally tubular shape as seen in cross section, as shown in FIG. 3. In another aspect, inner cheese portion 32 extends substantially continuously about the entire outer crust 16, yielding a stuffed crust pizza pie in which contents (e.g. cheese or other ingredients) are contained within outer crust 16 of pizza pie 10. Because of the presence of holes 18 at upper surface 15 of outer crust 16, inner cheese portion 32 is exposed to the environment prior to baking pizza pie 10.

However, during baking of pizza pie 10, inner cheese portion 32 melts and flows up through holes 18 in outer crust 16 to form cheese units 24 that are exposed at upper surface 15 of outer crust 16, as shown in FIG. 1. In some instances, the cheese units 24 flow out of holes 18, beyond the holes 18 and onto portions 19 at upper surface 15 of outer crust 16. Accordingly, this arrangement produces an appearance of inner cheese portion 32 having exploded up and out of holes 18 at upper surface 15 of outer crust 16.

In another embodiment, outer portion 14 of pizza pie 10 omits inner cheese portion 32 and the plurality of cheese units 24 are formed by simply depositing small portions of cheese in select locations on upper surface 15 of outer crust 16 in a pattern substantially the same as shown in FIG. 1, or some other desired pattern.

In one embodiment, outer cheese portion 17 is separate from (i.e. discontinuous from) the main cheese portion 20 on main portion 12. In other words, cheese units 24 (or other forms of outer cheese portion 17) are generally not connected to main cheese portion 20 of pizza pie 10. In another aspect, one or more of the cheese units 24 of outer cheese portion 17 are substantially continuous with the main cheese portion 20.

As shown in FIG. 1, in one embodiment, cheese units 24 have generally the same size and shape as holes 18 in outer crust 16. In other embodiments, as later described and illustrated in association with FIGS. 2-9, cheese units 24 can have other shapes and sizes.

Finally, in one embodiment, cheese units 24 comprise a single type of cheese (e.g. mozzarella), while in other embodiments, cheese units 24 comprise two or more types of cheese (e.g. mozzarella, cheddar, cojack, mozzarella, swiss, etc.). Additional features related to different types of cheese are described further in association with FIGS. 2-17.

Figure 2:
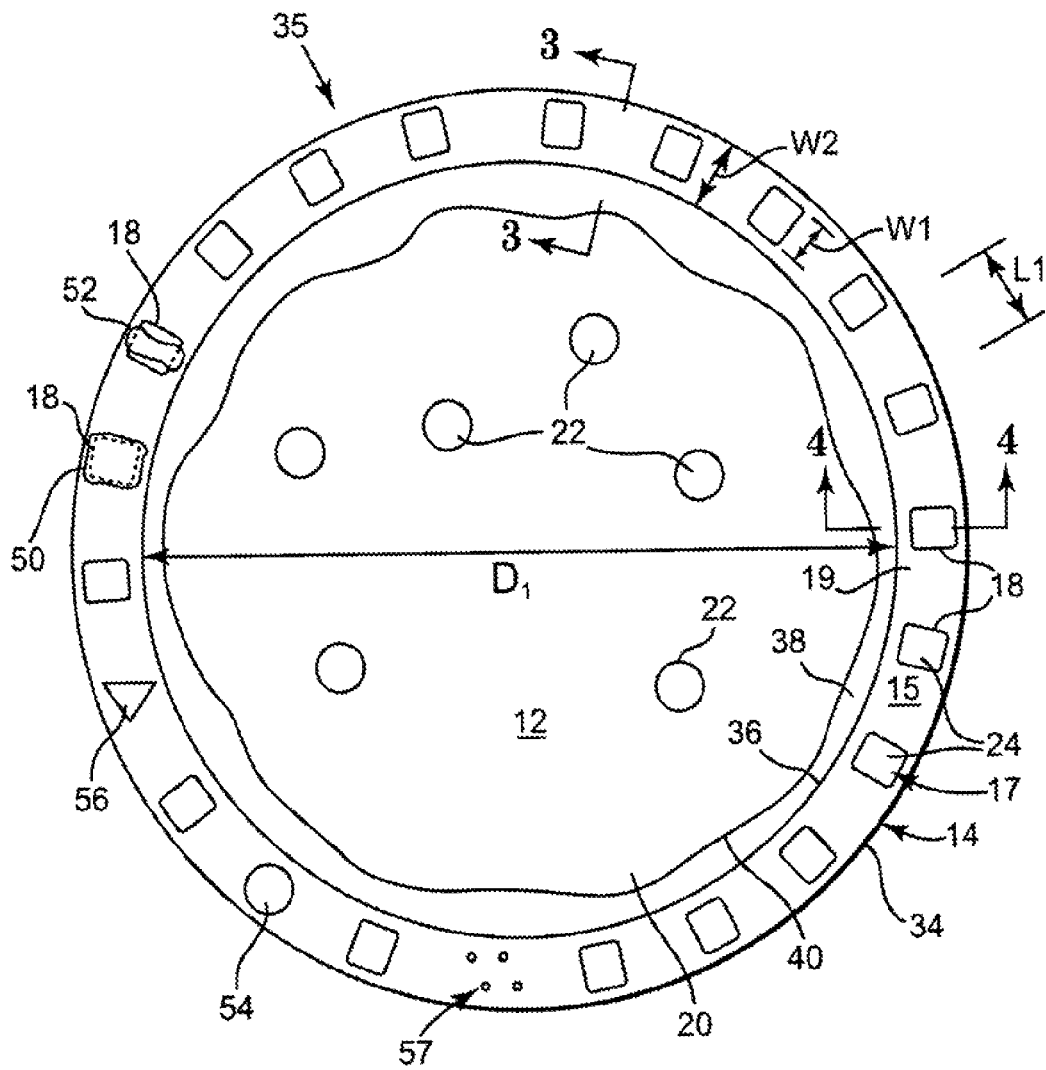
FIG. 2 is a plan view of a top portion of a pizza pie, according to an embodiment of the invention.
Figure 3:
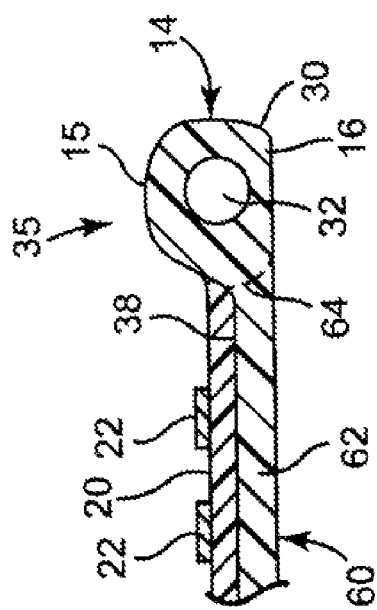
FIG. 3 is a partial sectional view of FIG. 2 as taken along lines 3-3, according to an embodiment of the invention.

FIG. 2 is a plan view of a top portion of a pizza pie 35, according to an embodiment of the invention. As shown in FIG. 2, pizza pie 35 has substantially the same features and attributes as pizza pie 10 of FIG. 1, and additional features and attributes as described below.

As shown in FIG. 2, pizza pie 35 comprises main portion 12 and outer portion 14, which includes outer edge 34 and inner edge 36. Main portion 12 comprises, among other things, toppings 22 and main cheese portion 20, which includes outer edge 40. In one embodiment, outer edge 40 of main cheese portion 20 generally contacts inner edge 36 of outer portion 14 while in other embodiments, outer edge 40 of main cheese portion 20 is separated from inner edge 36 of outer portion 14 by transition region 38.

Each hole 18 has a width (W1) while outer portion 14 has a width (W2). In one embodiment, width (W1) of holes 18 is less than width (W2) of outer portion 14 while in other embodiments, one or more holes 18 have a width (W1) that is generally the same as the width (W2) of outer portion 14.

As shown in FIG. 2, in one embodiment, outer cheese portion 17 extends about substantially the entire outer portion 14, thereby defining a shape generally corresponding to a general shape of the pizza pie. For example, in one embodiment, outer cheese portion 17 has a generally circular shape on a pizza pie 35 that has a generally circular shape. In other embodiments, not shown in FIG. 2, outer cheese portion 17 has a generally rectangular shape on a pizza pie that has a generally rectangular shape.

In another aspect, outer cheese portion 17 forms a plurality of cheese units 24 with each cheese unit 24 being separated from, and spaced apart from, each other by portions 19 of outer crust 16 that do not have cheese thereon (i.e., a non-cheese portion 19). In one aspect, the non-cheese portions 19 have a length (L1) defining a spacing between the adjacent cheese units 24 that is generally uniform, so that the cheese units 24 are spaced apart by a generally equal distance from each other. In another aspect, the spacing (L1) of non-cheese portions 19 between cheese units 24 is not the same (i.e., spacing L1 differs between adjacent cheese units 24) so that the cheese units 24 are spaced apart from each other by variable amounts.

In addition, in one embodiment, as shown in FIG. 2, each cheese unit 24 has substantially the same size and shape, being generally uniform in appearance. In one aspect, each cheese unit 24 has a size and shape generally corresponding to a size and shape of holes 18 in outer crust 16, with the edges of holes 18 generally containing and defining cheese units 24. However, as shown in FIG. 2, some cheese units 24 (e.g. cheese unit 52) have a size and shape slightly smaller (in one or more dimensions) than holes 18. In other embodiments, some cheese units 24 (e.g., cheese units 50) have a size and shape larger (in one or more dimensions) than holes 18. In still other embodiments, each cheese unit 24 is produced via a group or plurality of holes, with each hole being much smaller than a single cheese unit 24 wherein cheese flows out of each of holes (of the group of holes) to then flow together at upper surface 15 of outer crust from the separate holes to form the single cheese unit 24.

In other embodiments, one or more of cheese units 24 have a size and/or shape substantially different from other cheese units 24. For example, various cheese units 24 have one or more of following shapes: triangular; rectangular; speckled pattern; and circular. In one example, one or more cheese units 24 have a generally circular shape such as generally circular shaped cheese unit 54. In another example, one or more cheese units 24 have a generally triangular shape, such as generally triangular shaped cheese unit 56. The different shapes of cheese units 24 are formed by the shape of holes 18 (i.e., flow holes 18) through which portions of inner cheese portion 32 flow upward out of outer crust wall 30. In another aspect, one or more cheese units 24 have a speckled or dotted pattern, such as cheese unit 57, made up of a group of smaller holes that are close to each other with each cheese portion of each cheese unit 57 generally corresponding to a hole (or slit) through which the cheese flowed (from within the outer crust) to be formed at upper surface 15.

In another embodiment, one or more cheese units 24 have a particular shape (e.g. triangular) and are placed on upper surface 15 of outer crust 16 (one that has a generally continuous upper surface lacking holes 18) to generate the pattern of outer cheese portion 17.

As shown in FIG. 2, in one embodiment, when more than one cheese unit 24 has a different shape (with or without a correspondingly shaped/sized hole), cheese units 24 are arranged in an alternating pattern with adjacent cheese units 24 having different shapes, such as a series of a generally rectangular cheese units 24, a generally triangular cheese unit 56, another generally rectangular cheese unit 24, and a generally circular shaped cheese unit 54, etc. or other combinations.

Accordingly, outer cheese portion 17 can comprise a wide variety of patterns, and be produced by a wide variety of patterns of flow holes to move cheese from a position within an outer crust to a position at an upper surface of the outer crust.

FIG. 3 is a sectional view of FIG. 2 as taken along lines 3-3. As shown in FIG. 3, pizza pie 35 comprises main portion 12 and outer portion 14. Main portion 12 comprises previously illustrated main cheese portion 20 and toppings 22, which are set upon upper surface 38 of pizza crust 60. Pizza crust 60 includes main crust 62 (generally corresponding to main portion 12 of pizza pie 10,35) and outer crust 16, with outer crust 16 defining crust wall 30 containing inner cheese portion 32. Phantom lines 64 indicate a general transition or border between outer crust wall 30 and main crust 62, which may or may not correspond to an actual physical transition region. Accordingly, as seen in cross section of FIG. 3, outer crust wall 30 has a generally tubular shape arranged to contain inner cheese portion 32.

FIG. 3 illustrates a region of pizza pie 35 in which outer crust 16 has a generally continuous form adjacent its upper surface 15, so that inner cheese portion 32 remains hidden within outer crust wall 30 in this region.

Figure 4:
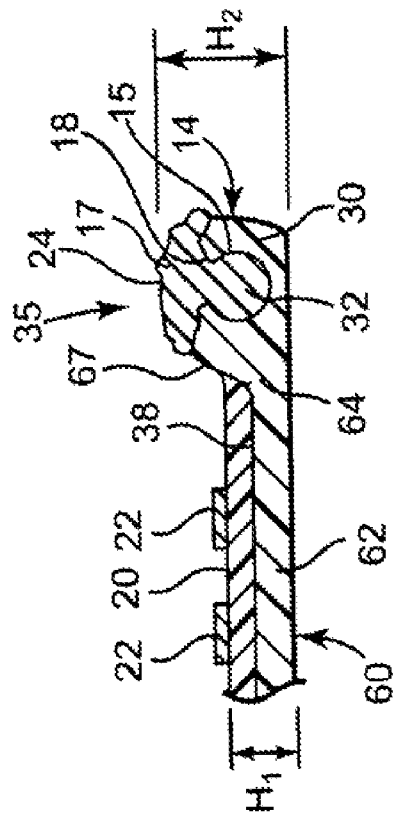
FIG. 4 is a partial sectional view of FIG. 2 as taken along lines 4-4, according to an embodiment of the invention.

FIG. 4 illustrates a region of pizza pie 35 including a hole 18 (i.e. a flow hole) adjacent upper surface 15 of outer crust 16 to enable inner cheese portion 32 to flow up and out of crust wall 30, so that inner cheese portion 32 no longer remains hidden within outer crust 16. This process yields cheese unit 24 of outer cheese portion 17 residing adjacent upper surface 15 of outer crust 16 through flow hole 18.

In one aspect, a flow rate of the inner cheese portion 32 (i.e. the viscosity of the cheese during baking) affects the appearance of the outer cheese portion 17, because the flow rate partially controls the volume and speed at which inner cheese portion 32 flows out of its embedded position through flow holes 18. Accordingly, a type or variety of cheese is selected to achieve a desired rate of flow of inner cheese portion 32 through holes 18, depending upon the pattern that one selects for outer cheese portion 17.

In another aspect, pressure exerted by outer crust wall 30 on inner cheese portion 32 also affects the volume and/or speed at which inner cheese portion 32 flows up and out of the flow holes 18. In other words, an inner cheese portion 32 that is contained tightly within outer crust wall 30 will tend to flow more readily out of flow holes 18 (and therefore onto upper surface 15 of outer crust 16) than an inner cheese portion 32 that is contained loosely within outer crust wall 30.

As also shown in FIG. 4, in one embodiment, main cheese portion 20 has a first height (H1) and outer cheese portion 17 has a second height (H2) that is substantially different from the first height (H1), with height H2 being greater than height H1. Accordingly, in this embodiment, outer cheese portion 17 extends in a generally horizontal plane separate and spaced apart from a generally horizontal plane through which main cheese portion 20 extends. This arrangement vertically separates and further differentiates main cheese portion 20 from outer cheese portion 17. In another embodiment, main cheese portion 20 has a first height (H1) and the outer cheese portion 17 has a second height (H2) that is substantially the same as the first height (H1), yielding a pizza pie having two cheese portions (e.g., a main cheese portion 20 and outer cheese portion 17) that are separated from each other laterally while extending in generally the same plane.

Finally, in one aspect, portion 67 of outer crust 16, as shown in FIG. 4, generally corresponds to a zone of separation between main cheese portion 20 and outer cheese portion 17.

FIG. 5 is a plan view of a top portion of a pizza pie 100, according to an embodiment of the invention. As shown in FIG. 5, pizza pie 100 has substantially the same features and attributes as pizza pies 10,35 of FIGS. 1-4, except that an outer cheese portion 102 forms a generally continuous ring at upper surface 15 of outer crust 16. As shown in FIG. 5, outer cheese portion 102 comprises an exposed portion 104, and as shown in FIG. 6, a vertical portion 106 extending from inner cheese portion 32 through a slot 110 in outer crust 16. As shown in FIG. 5, outer cheese portion 102 has width (W3) which is generally less than a width (W4) of outer portion 14. In addition, outer cheese portion 102 is separated from main cheese portion 20 because outer cheese portion 102 occupies a width less than the entire width of outer crust 16. In another embodiment, transition region 38 has a width that further separates main cheese portion 20 from outer cheese ring 102. However, in most instances, the width of transition region 38 is negligible, with main cheese portion 20 abutting against inner edge 36 of outer portion 14.

In one embodiment, pizza pie 100 shown in FIG. 5 is formed by making a stuffed crust pizza, i.e. a pizza pie with cheese embedded within the outer crust 16, such as inner cheese portion 32 contained within outer crust wall 30 (shown in FIGS. 1 and 3-4). Prior to baking, a slit 110 (shown in FIG. 6) is cut in upper surface 15 of outer crust 16 to partially expose inner cheese portion 30 contained within outer crust 16. As the pizza pie is baked, inner cheese portion 32 begins to flow, and flows up through slot 110, and out onto upper surface 15 of outer crust 16 to form outer cheese portion 102 in a generally ring shaped pattern. This configuration is illustrated in FIG. 6.

In another embodiment, pizza pie 100 is formed by simply placing a ring of cheese onto the upper surface 15 of the outer crust 16 and then baking the pizza pie to yield outer cheese portion 102. In this embodiment, the ring of cheese has a flow rate to enable controlled flow to maintain the ring to have substantially the same shape and size both during and after baking. Moreover, in one aspect, the outer cheese portion 102 is present in combination with a stuffed crust, i.e., an outer crust 16 having an inner cheese portion 32 that is contained within the outer crust 16 and not exposed to the upper surface 15 of the outer crust. In another aspect, although outer crust 16 of pizza pie 100 is not stuffed (i.e., does not include any cheese portions within outer crust wall 32), generally ring shaped outer cheese portion 102 of outer crust 16 is still located at upper surface 15 of outer crust 16.

Ring shaped outer cheese portion 102, in combination with main cheese portion 20, creates an arrangement of generally concentric cheese portions, that are generally spaced apart from each other. In one embodiment, only two separate cheese portions are concentrically arranged while in other embodiments, more than two separate generally circular, or ring-shaped cheese portions form a generally concentric arrangement on a pizza pie.

In one embodiment, outer cheese ring 102 forms a generally thin ring (W3 is small) that covers an insubstantial portion of upper surface 15 of outer crust 16. In other embodiments, the outer cheese portion 102 forms a generally wide ring (W3 is large) that covers a substantial portion of upper surface 15 of outer crust 16.

In one embodiment, outer cheese ring 102 has a generally uniform ring-shape while in other embodiments, outer cheese ring 12 has a undulating pattern or an angled pattern, such as a zig-zag pattern, while still forming an overall generally circular shape generally corresponding to the overall shape of pizza pie 100.

Figure 7:
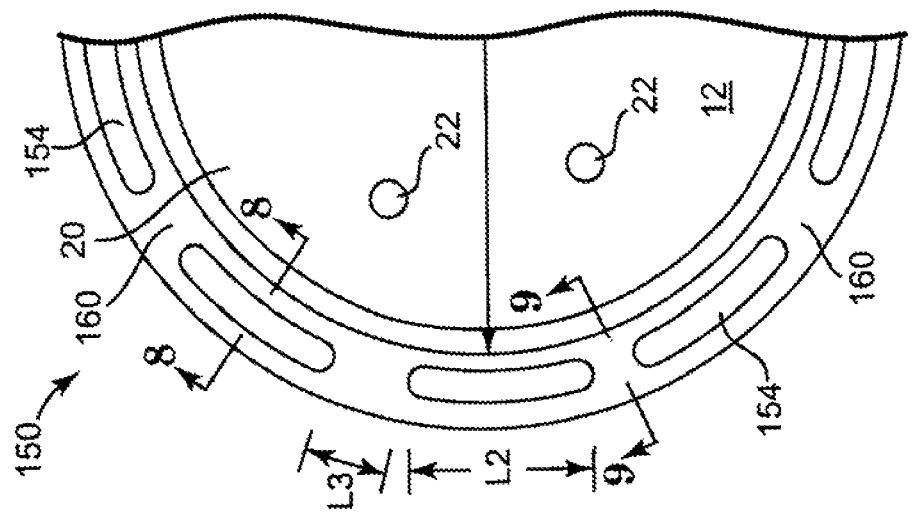
FIG. 7 is a partial plan view of a top portion of a pizza pie, according to an embodiment of the invention.

FIG. 7 is a partial plan view of a top portion of a pizza pie 150, according to an embodiment of the invention. As shown in FIG. 7, pizza pie 150 has substantially the same features and attributes as pizza pie 100 of FIGS. 5-6, except that an outer cheese portion 152 comprises a plurality of cheese arcs 154, each having a generally arcuate shape, and arranged together in a generally circular pattern at upper surface 15 of outer crust 16 to extend about a periphery of pizza pie 150.

Each cheese are 154 has a length (L2) with non-cheese covered portions 160 (i.e. a portion of outer crust 16 lacking cheese at the upper surface 15) of outer crust 16 having a length (L3) interposed between adjacent cheese arcs 154. In one embodiment, cheese arcs 154 have generally the same length (L2) while in other embodiments, one or more cheese arcs 154 have a different width relative to each other. In one embodiment, non-cheese crust portions 160 have generally the same length (L3) while in other embodiments, non-cheese portions 160 have one or more different lengths relative to each other.

Figure 8:
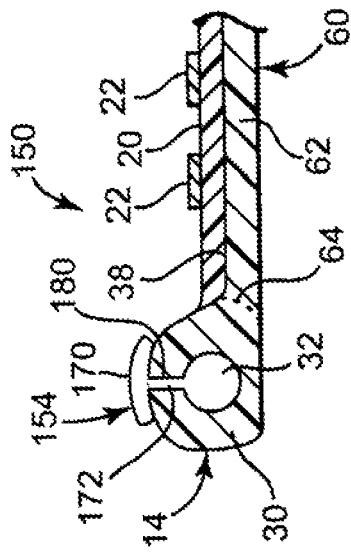
FIG. 8 is a partial sectional view of FIG. 7 as taken along lines 8-8, according to an embodiment of the invention.

FIG. 8 is a sectional view of FIG. 7 illustrating one of cheese arcs 154 at upper surface 15 of outer crust 16 of pizza pie 150. As shown in FIG. 8, cheese are 154 includes an exposed portion 170 (at upper surface 15 of outer crust 16) that form part of, and is an extension of a flow portion 172. Flow portion 172 extends from inner cheese portion 32 through slot 180.

Figure 9:
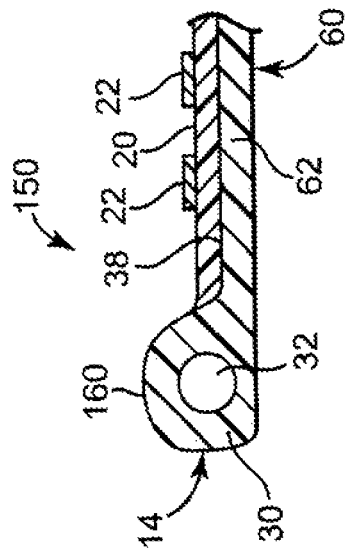
FIG. 9 is partial sectional view of FIG. 7 as taken along lines 9-9, according to an embodiment of the invention.

FIG. 9 is a sectional view of FIG. 7 illustrating a portion of pizza pie at non-cheese covered crust portion 160 between adjacent cheese arcs 154. As shown in FIG. 9, outer crust 16 has an upper surface 15 that does not carry an outer cheese are 154, nor having any slits or slots in its upper surface 15.

In another embodiment, outer cheese arcs 154 are disposed on top of upper surface 15 of outer crust 16 without extending from inner cheese portion 32. Instead, outer cheese arcs 154 are formed by placing a plurality of lengths of cheese, each length having an arcuate shape, along a portion of upper surface 154 of outer crust 16 to form the generally circular pattern on pizza pie 150.

As in other embodiments, the group of outer cheese arcs 154 and main cheese portion 20 together form a generally concentric pattern of cheese discs and rings, with cheese arcs 154 being separate from and spaced from main cheese portion 20.

Figure 11:
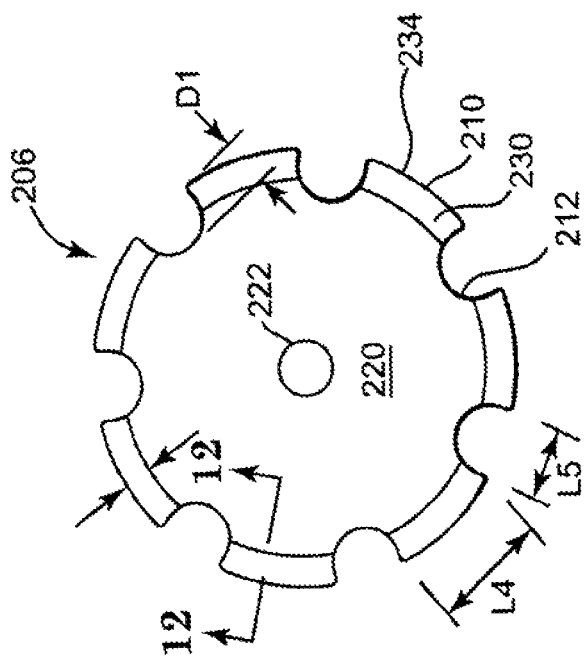
FIG. 11 is an enlarged plan view of a disc of a cutting tool, according to an embodiment of the invention.
Figure 10:
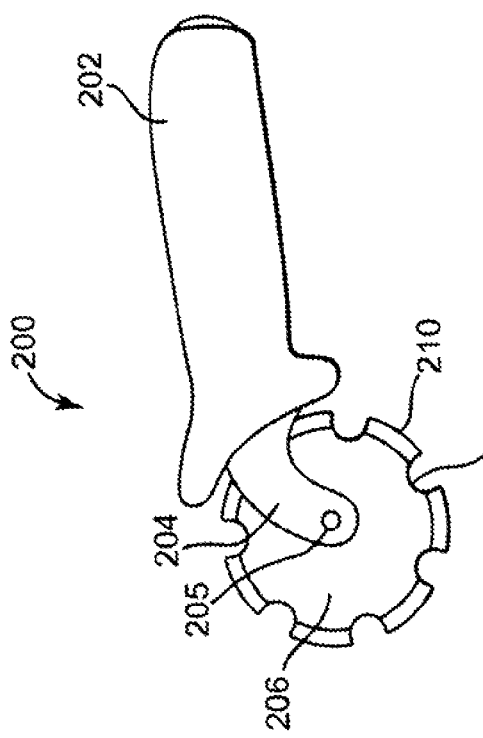
FIG. 10 is plan view of a cutting tool, according to an embodiment of the invention.
Figure 12:
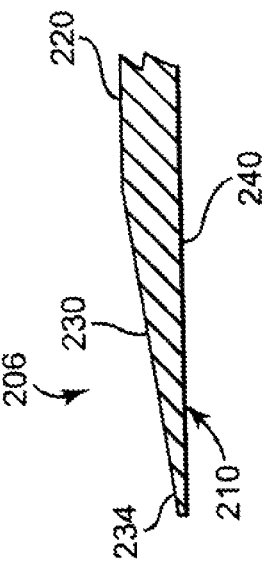
FIG. 12 is sectional view of FIG. 11, as taken along lines 12-12, illustrating a blade portion of the cutting tool, according to an embodiment of the invention.

FIGS. 10-12 illustrate a cutting device adapted for use in a method of making a pizza pie, according to one embodiment of the invention. Pizza pies according to embodiments of the invention can be made in various ways, and therefore are not limited to a method of making only with the cutting tool described and illustrated in association with FIGS. 10-12 and/or only with the cutting guide later described and illustrated in association with FIGS. 16-17.

FIG. 10 is a plan view of a cutting tool 200, according to one embodiment of the invention. As shown in FIG. 10, cutting tool 200 comprises handle 202, arm 204, and cutting disc 206 which is rotatably mounted on arm 204 via pin 205. Disc 206 comprises blade portions 210 with notches 212 interposed between adjacent blade portions 210. In one embodiment of the invention, disc 206 of cutting tool 200 is manually rolled along a pizza pie dough, prior to baking; to form slits in the pizza dough so that when the pizza dough is stretched and positioned to form a stuffed crust, the slits are reshaped to become flow holes at an upper surface of outer crust of pizza pie.

FIG. 11 is an enlarged side view of disc 206 of cutting tool 200, according to an embodiment of the invention. As shown in FIG. 11, disc 206 comprises blade portions 210 and notches 212, as previously described. Disc 206 also comprises body 220 with central hole 222 for receiving fastening pin 205 (FIG. 10) to rotatably mount disc 206 relative to arm 204 of cutting tool 200. Each blade portion 210 comprises face 230 and cutting edge 234. Each blade portion 210 has a length (LA), which generally corresponds to a length of each slit formed in a pizza dough by rolling the disc 206 on the pizza dough. Each notch 212 has a length (L5), which generally corresponds to a length of uncut portions of pizza crust dough interposed between adjacent slits in the crust. The depth (D1) of each notch 212 generally corresponds to at least a thickness of a pizza dough through which blade portions 210 must cut, so that notches 212 will not cut the portions of pizza crust dough between the slits.

FIG. 12 is a sectional view of FIG. 11 as taken along lines 12-12. As shown in FIG. 12, in one embodiment, blade portion 210 extends from body 220 and comprises generally inclined face 230, edge 234, and generally flat second surface 240.

In one embodiment, a method of making a pizza pie is performed using cutting tool 200 to form spaced apart slits in a pizza dough crust, for eventual reshaping of those slits into holes in an outer crust for flowing cheese from an embedded position to an exposed position on top of an outer crust of the pizza pie (when fully assembled).

Figure 13:
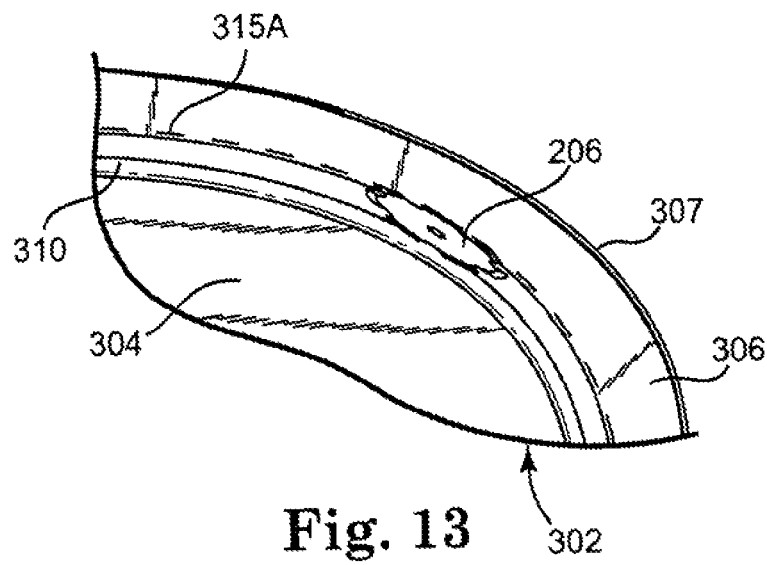
FIG. 13 is a partial perspective view showing a partially assembled pizza pie, according to an embodiment of the invention.
Figure 14:
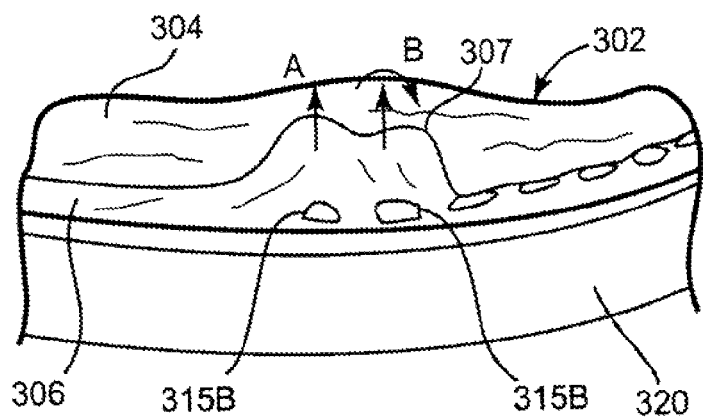
FIG. 14 is a partial perspective view showing a partially assembled pizza pie, according to an embodiment of the invention.
Figure 15:
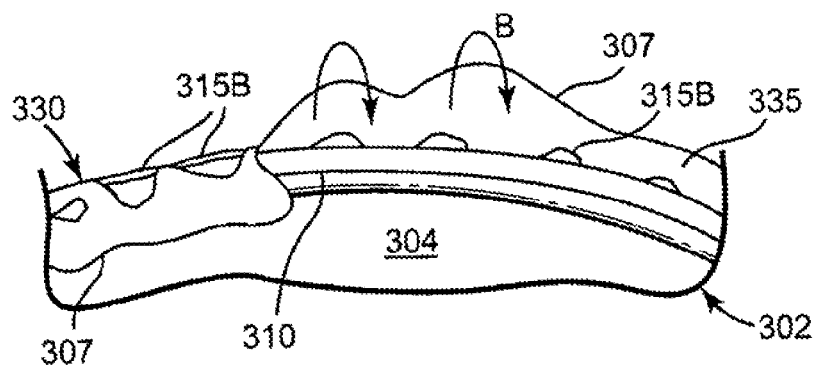
FIG. 15 is a partial perspective view of a partially assembled pizza pie, according to an embodiment of the invention.

FIGS. 13-15 are perspective views of a pizza pie 302, as shown in a series of partially assembled states, in a method of making a pizza pie, according to an embodiment of the invention. FIG. 13 illustrates a portion of unbaked pizza pie 302 in a partially assembled state as supported within pizza pan 320 (shown in FIG. 14). As shown in FIG. 13, pizza pie 302 comprises main portion 304 and outer crust 306 with outer edge 307 and inner cheese portion 310. A pattern of slits 315A is formed in outer crust dough 306 above, and adjacent to inner cheese portion 310. Slits 315A are formed by various means, such as a knife, a dough cutting device, or cutting tool 200 of FIGS. 10-12.

In one embodiment, slits 315A shown in FIG. 13 are formed through the use of cutting tool 200 (shown in FIGS. 10-12) by rolling the cutting disc 206 against crust wall 306 just above the inner cheese portion 310, the slits 315A being formed about substantially the entire periphery of the unbaked pizza crust. Blades 210 of cutting disc 206 form the slits 315A while notches 212 of disc 206 (interposed between adjacent blades 210) generally correspond to the non-cut portions of outer crust 306 that form spacing between adjacent slits 315A.

In other embodiments, a cutting guide is used to guide the cutting disc 206 of cutting tool 200 into the desired position (relative to outer crust 206 and inner cheese portion 310) and enables rapid formation of slits 315A about the periphery of outer crust 306. One such cutting guide is described and illustrated later in association with FIGS. 16-17.

FIG. 14 illustrates the partially assembled pizza pie 302 in a perspective view taken from outside of pan 320. As shown in FIG. 14, outer edge 307 of outer crust 306 is manually pulled upward relative to pan 320, as shown by directional arrows A, and then rotated downward over inner cheese portion 310, as indicated by directional arrow B. The pulling action on outer crust 206 causes slits 315A to become reshaped into holes 315B, which are shown partially extending beyond an edge 321 of pizza pan 320.

FIG. 15 is another perspective view of pizza pie 302 as taken from an interior portion of pizza pie 302 looking toward an outer edge of a pizza pan. As shown in FIG. 15, partially assembled pizza pie 302 includes a completed section 330 of outer crust 306 and a partially constructed section 335 in which outer crust 306 is being stretched and pulled over inner cheese portion 310 (indicated by directional arrow B) until appearing like completed section 330. In completed section 330, a stretched portion including holes 315B are positioned over inner cheese portion 310 and an outer edge 307 of outer crust dough 306 is sealed against main crust portion 304 to form assembled outer crust section 330. Accordingly, an assembled outer crust section 330 includes a series of holes 315B at an upper surface of the outer crust 16 to expose inner cheese portion 310 embedded within outer crust 16 (which flow up to the upper surface 15 upon baking) to yield a plurality of cheese members arranged in a generally circular pattern about the outer crust. In one embodiment, assembled outer crust section 330 has an outer crust configuration substantially as shown in FIGS. 1-4.

Figure 16:
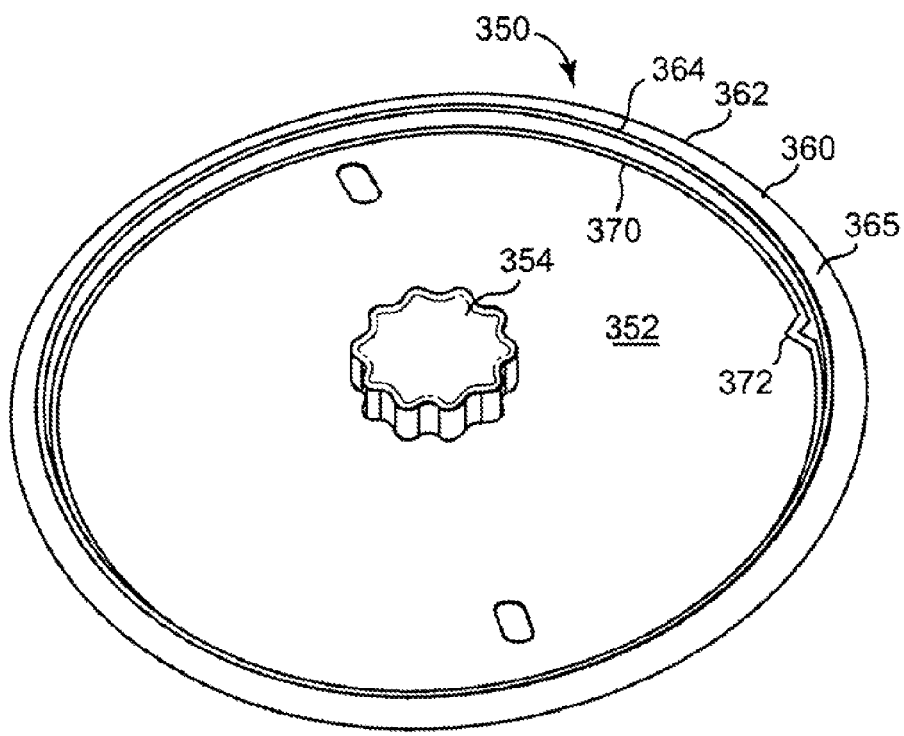
FIG. 16 is plan view of a cutting guide, according to an embodiment of the invention.
Figure 17:
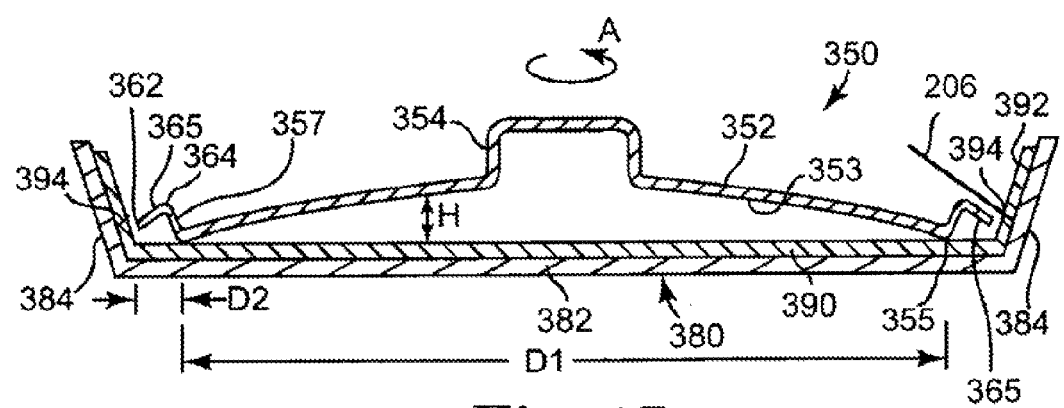
FIG. 17 is sectional view of FIG. 16, as taken along lines 17-17, of the cutting guide in combination with a pizza pan, a pizza crust dough and a cutting tool according to an embodiment of the invention.

FIGS. 16-17 illustrate a cutting guide 350, according to an embodiment of the invention, configured to assist making slits in an outer crust of pizza pie. FIG. 16 is a perspective view of cutting guide 350. As shown in FIG. 16, cutting guide 350 comprises dome 352 with central handle 354 and outer ledge 360. Outer ledge 360 includes outer edge 362, inner edge 364, and support surface 365. Outer ledge 360 is joined to dome 352 at junction 370. Notch 372 is formed at junction 370 and acts as a marker to facilitate tracking rotation of cutting guide 350 while cutting a pizza pie.

FIG. 17 is a sectional view of cutting guide 350 set relative to crust 390 and pizza pan 380. As shown in FIG. 350, cutting guide 350 comprises dome 352, which has a generally curved shape, and lower outer edge 355, which is adapted to make contact with a base surface of pizza crust. Dome 352 is sized and shaped so that interior surface 353 of dome 352 is spaced vertically from surface of pizza pie, to insure adequate clearance of dome 352 from base surface of pizza crust, while cutting guide 350 is set securely onto a pizza dough via edge 355.

Dome 352 has a diameter (D1) generally corresponding to a diameter of pizza crust 390 and bottom portion 382 of pizza pan 380. Outer ledge 360 is connected to dome 352 via generally vertical portion 357 and extends beyond dome 352 by an additional distance noted as D2 to place outer edge 362 of ledge 360 directly at vertical portion 392 of crust at a position along vertical wall 384 of pizza pan at which slits 394 are to be formed. In one aspect, as shown in FIG. 17, outer ledge 360 is configured to be at a declined angle relative to a generally horizontal plane, thereby tilting support surface 365 toward generally vertical wall 384 of pizza pan 380.

As shown in FIG. 17, cutting disc 206 (shown in side view) rests against surface 365 of ledge 360 to position blade portion 210 of disc 206 against vertical portion 392 of crust 390 to form slits 394. In use, cutting disc 206 is held in this position relative to cutting guide 350, pizza pie crust 390 and pizza pan 380 while handle 354 of guide 350 is grasped to spin (indicated by directional arrow A) the entire combination of the cutting guide 350, pizza pie crust, and pizza pan 380 while maintaining cutting disc 206 (via cutting tool 200) in sliding contact against the support surface 365 and against vertical portion 394 of crust 390. This arrangement enables a rapid formation of slits 394 (slits 315A in FIGS. 13-15) in the outer crust.

In another embodiment, the outer crust is formed without cutting guide 350 and without cutting tool 200. Instead, with an outer crust containing an inner cheese portion (to form a stuffed crust), a device is used to cut out portions of the outer crust at upper surface to expose inner cheese portion for later flow up to upper surface of the outer crust.

Embodiments of the invention are directed to systems and methods for making a pizza pie having an outer cheese portion on an outer crust region that is separate from a main cheese portion of the pizza pie. A cutting tool and/or a cutting guide enable formation of at least one opening at an outer crust region of a pizza pie to cause an inner cheese portion embedded within the outer crust to flow through the at least one opening, thereby forming the outer cheese portion at the upper surface of the outer crust. In addition to locating cheese on top of an outer crust of a pizza pie, embodiments of the invention facilitate an appearance of the pizza pie in which cheese has exploded outward from a position within the outer crust up and onto (or at) an upper surface of the outer crust. More than one type of cheese can be incorporated so that the outer cheese portion comprises multiple types of cheeses, producing multiple flavors and/or a variegated color appearance of the outer cheese portion. Other variations include having a different type of cheese at each major portion of the pizza pie, so that the main portion has a first type of cheese, the inner cheese portion has a second type of cheese, and the outer cheese portion has a third type of cheese. Finally, embodiments of the invention include three separate cheese portions, an outer cheese portion, a main cheese portion and an inner cheese portion within the outer crust. This arrangement places cheese at three distinct locations on pizza pie, so that cheese is present seemingly at every portion of the pizza in a controlled manner and in selected patterns.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of making a pizza pie comprising:
    arranging a pizza crust dough within a pizza pan to configure a main region of the pizza crust dough onto a base portion of the pizza pan and an outer region of the pizza crust dough against an outer wall portion of the pizza pan;
    placing a cutting guide onto the pizza crust dough to position a support surface of the cutting guide adjacent the outer region of the pizza crust dough at a position elevated vertically along the outer wall portion of the pizza pan;

locating a tool in a support position upon the support surface of the cutting guide and pressing a notched cutting disc of the tool into the outer region of the pizza crust dough while maintaining the tool in the support position;

moving the tool along the support surface of the cutting guide to rollingly translate the cutting disc about substantially the entire periphery of the pizza crust dough while continuing to press the notched cutting disc into the pizza crust dough, thereby forming a plurality of slits in the outer region of the pizza crust dough;

arranging an inner cheese portion at a junction of the main region and the outer region of the pizza crust dough adjacent a location of the plurality of slits in the outer region of the pizza crust dough; and manipulating the outer region of the pizza crust dough to embed the inner cheese portion within the outer region and to cause each slit to be reshaped as a hole and positioned generally over the inner cheese portion at the upper surface of the outer region.

2. The method of claim 1 wherein moving the tool comprises:

rotating the cutting guide while pressing the cutting guide into contact against the main region of the pizza crust dough and while maintaining the tool in the support position relative to the support surface of the cutting guide, thereby causing rotation of the pizza pan and the pizza crust dough relative to the tool as the tool slides along the support surface to cause formation of the slits in the pizza crust dough.

3. The method of claim 1 wherein locating the tool comprises:

arranging the support surface to be an inclined angle relative to a substantially horizontal plane.

4. The method of claim 1, and further comprising:

baking the pizza pie to cause the inner cheese portion to flow out of at least one hole from within the outer region out to the upper surface of the outer region.

5. A method of cutting a pizza crust dough, comprising the steps of:

arranging the pizza crust dough within a pizza pan to configure a main region of the pizza crust dough onto a base portion of the pizza pan and an outer region of the pizza crust dough against an outer wall portion of the pizza pan;

placing a cutting guide onto the pizza crust dough, said cutting guide having a generally circular shape with a diameter generally corresponding to a diameter of the pizza pan, and including a central dome and an outer ledge extending from a circumferential edge of the central dome, such that the cutting guide is placed within the pizza pan with the circumferential edge of the central dome contacting the pizza crust dough at the base portion of the pizza pan while an interior surface of the central dome remains vertically spaced from the pizza crust dough and the base portion of the pizza pan, and while the outer ledge of the cutting guide is positioned adjacent the outer wall portion of the pizza pan; and moving a cutting tool having an outer cutting edge along the outer ledge of the cutting guide to cause the outer cutting edge of the cutting tool to form one or more openings in the pizza crust dough about a periphery of the pizza crust dough.

6. The method of cutting a pizza crust dough as recited in claim 5, wherein the cutting tool comprises:

a handle including an arm; and a disc rotatably mounted to the arm with the outer cutting edge of the disc having a plurality of blade portions and a plurality of notched portions, with the notched portions interposed between adjacent blade portions.

7. The method of cutting a pizza crust dough as recited in claim 6, wherein each notched portion of the disc has an arcuate shape.

8. The method of cutting a pizza crust dough as recited in claim 5, wherein the central dome of the guide has a substantially hemispherical shape with a handle positioned at a top of the hemispherical shape of the central dome.

9. A method for making a pizza pie comprising the steps of:

arranging a pizza crust dough within a pizza pan to configure a main region of the pizza crust dough onto a base portion of the pizza pan and an outer region of the pizza crust dough against an outer wall portion of the pizza pan;

placing a cutting guide onto the pizza crust dough, said cutting guide having a generally circular shape with a diameter generally corresponding to a diameter of the pizza pan, and including a central dome and an outer ledge extending from a circumferential edge of the central dome, such that the cutting guide is placed within the pizza pan with the circumferential edge of the central dome contacting the pizza crust dough at the base portion of the pizza pan while an interior surface of the central dome remains vertically spaced from the pizza crust dough and the base portion of the pizza pan, and while the outer ledge of the cutting guide is positioned adjacent the outer wall portion of the pizza pan;

moving a cutting tool having an outer cutting edge along the outer ledge of the cutting guide to cause the outer cutting edge of the cutting tool to form one or more openings in the pizza crust dough about a periphery of the pizza crust dough;

arranging an inner cheese portion at a junction of the main region and the outer region of the pizza crust dough adjacent a location of the one or more openings in the pizza crust dough; and manipulating the outer region of the pizza crust dough to embed the inner cheese portion within the outer region and to cause each of the one or more openings to be reshaped as a hole and positioned generally over the inner cheese portion at the upper surface of the outer region.

10. The method for making a pizza pie as recited in claim 9, and further comprising the step of:

baking the pizza pie to cause the inner cheese portion to flow out of at least one hole from within the outer region out to the upper surface of the outer region.

* * * * *